(12) United States Patent
Sapp et al.

(10) Patent No.: US 12,004,486 B2
(45) Date of Patent: *Jun. 11, 2024

(54) INFORMATION HANDLING AND ALARM SYSTEM

(71) Applicant: Pet Notify, Inc., Bellevue, WA (US)

(72) Inventors: Layne Sapp, Kirkland, WA (US); Taylor Rork, Kirkland, WA (US)

(73) Assignee: Pet Notify, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,176

(22) Filed: Sep. 17, 2023

(65) Prior Publication Data
US 2024/0000040 A1    Jan. 4, 2024

Related U.S. Application Data

(63) Continuation of application No. 17/039,699, filed on Sep. 30, 2020, now Pat. No. 11,793,167.

(51) Int. Cl.
*H04W 4/021*    (2018.01)
*A01K 15/02*    (2006.01)
*A01K 27/00*    (2006.01)
*G06F 16/2457*    (2019.01)
*G06Q 50/00*    (2012.01)
*H04L 67/30*    (2022.01)
*H04W 4/029*    (2018.01)
*H04W 4/90*    (2018.01)

(52) U.S. Cl.
CPC .......... *A01K 15/023* (2013.01); *A01K 27/001* (2013.01); *A01K 27/009* (2013.01); *G06F 16/24575* (2019.01); *G06Q 50/01* (2013.01); *H04W 4/021* (2013.01); *H04W 4/029* (2018.02)

(58) Field of Classification Search
CPC .................................................... A01K 15/023
See application file for complete search history.

(56) References Cited

U.S. PATENT DOCUMENTS

| | | | |
|---|---|---|---|
| 2011/0172916 A1* | 7/2011 | Pakzad | G01C 21/14 |
| | | | 701/533 |
| 2013/0157628 A1* | 6/2013 | Kim | A01K 15/04 |
| | | | 455/414.1 |
| 2019/0281794 A1* | 9/2019 | Ehrman | A01K 27/009 |
| 2022/0035510 A1* | 2/2022 | Behzadi | H04W 4/029 |

* cited by examiner

*Primary Examiner* — Joseph H Feild
*Assistant Examiner* — Pameshanand Mahase (57) ABSTRACT

An information handling and alarm system is provided to help pet owners care for and find lost pets.

12 Claims, 7 Drawing Sheets

INFORMATION HANDLING AND ALARM SYSTEM

CROSS-REFERENCES TO RELATED APPLICATIONS

This application takes priority to U.S. application Ser. No. 17/039,699, filed on Sep. 30, 2020, which takes priority to U.S. Application 62/907,899, filed on Sep. 30, 2019; both applications are incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Pet owners leave their pets at home every day, expecting to return home to take care of them. Sometimes, pet owners are delayed at work, preventing them from providing care, such as taking their dog for a walk at the appropriate time. In a worst-case scenario, a pet owner may be unable to return to their pet for an extended period due to an accident, hospitalization, or another unplanned event. It is imperative that the pet owner be able to communicate with a pet caretaker.

In some cases, pet owners may rely on a pet caretaker for routine activities such as taking a dog for a midday walk or a pet to the vet. Pet caretakers may need a pet owner to remind them of this task. Additionally, the pet caretaker should communicate that pet-related tasks are completed in a timely manner so that the pet owner can have peace of mind.

In some instances, pet owners may want to alert pet caretakers of an emergency that a pet may be experiencing. The pet owner may be unable to respond to the emergency or need help. Here, providing a system that would alert known caretakers and first responders of the emergency would be beneficial.

Pet owners may also depend on a pet rescuer to care for a pet when it gets lost. Pets, such as dogs, commonly wear collars with a tag with the pet owner's contact information. However, the pet rescuer may not be able to reach a pet owner quickly. In this case, it would be beneficial for the pet rescuer to know about any food allergies or medical conditions that the pet may have. It would also be beneficial if the pet rescuer could notify a pet owner or pet caretaker who may be able to collect the pet from the pet rescuer.

There is a need for an information handling and alarm system that allows pet owners to confirm that their pets are safe and that pet needs are met.

BRIEF DESCRIPTION OF THE INVENTION

An object of the invention is to provide an information handling and alarm system that allows pet owners to alert a trusted pet caretaker when the pet owner cannot take care of a pet.

Another object of this invention is to provide an information handling and alarm system that can provide confirmation to a pet owner that pet caretakers have completed an assigned pet care task.

Another object of this invention is to provide a pet collar that communicates with the information handling and alarm system.

Another object of this invention is to provide an information handling and alarm system that notifies emergency professionals when a pet owner has "gone missing."

Another object of this invention is to provide an information handling and alarm system that can provide essential information regarding a pet to third-parties.

Another object of this invention is to provide a pet owner with an automated phone call, email, and/or SMS message when a third-party enters an identification number into the information handling and alarm system.

Another object of this invention is to provide an information handling and alarm system that allows a third-party to communicate with a pet owner or caretaker.

Another object of the invention is to provide an alarm that notifies third-parties when the user does not turn off the alert.

DESCRIPTION OF THE SEVERAL VIEWS OF THE DRAWINGS

Other features and advantages of the present invention will become apparent in the following detailed descriptions of the preferred embodiment with reference to the accompanying drawings.

DETAILED DESCRIPTION OF THE INVENTION

In the following detailed description, reference is made to the accompanying drawings, which form a part hereof. Using similar or the same symbol in different drawings typically indicates similar or identical items unless context dictates otherwise.

The illustrative embodiments described in the detailed description, drawings, and claims are not meant to be limiting. Other embodiments may be utilized, and other changes may be made without departing from the subject matter's spirit or scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to represent its class, and the non-inclusion of specific components (e.g., operations), devices, and objects should not be considered limiting.

The present application uses formal outline headings for clarity of presentation. However, it is to be understood that the outline headings are for presentation purposes and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting. Given by way of overview, illustrative embodiments include an information handling and alarm system (100) that creates a communication bridge between pet owners, pet caretakers, and pet rescuers and a collar (400) that communicates with the information handling and alarm system (100). Although the description below is provided for pets, it will be obvious to one having ordinary skill in the art that the information handling and alarm system (100) can be employed in any situation where something or someone needs care.

Figure 1:
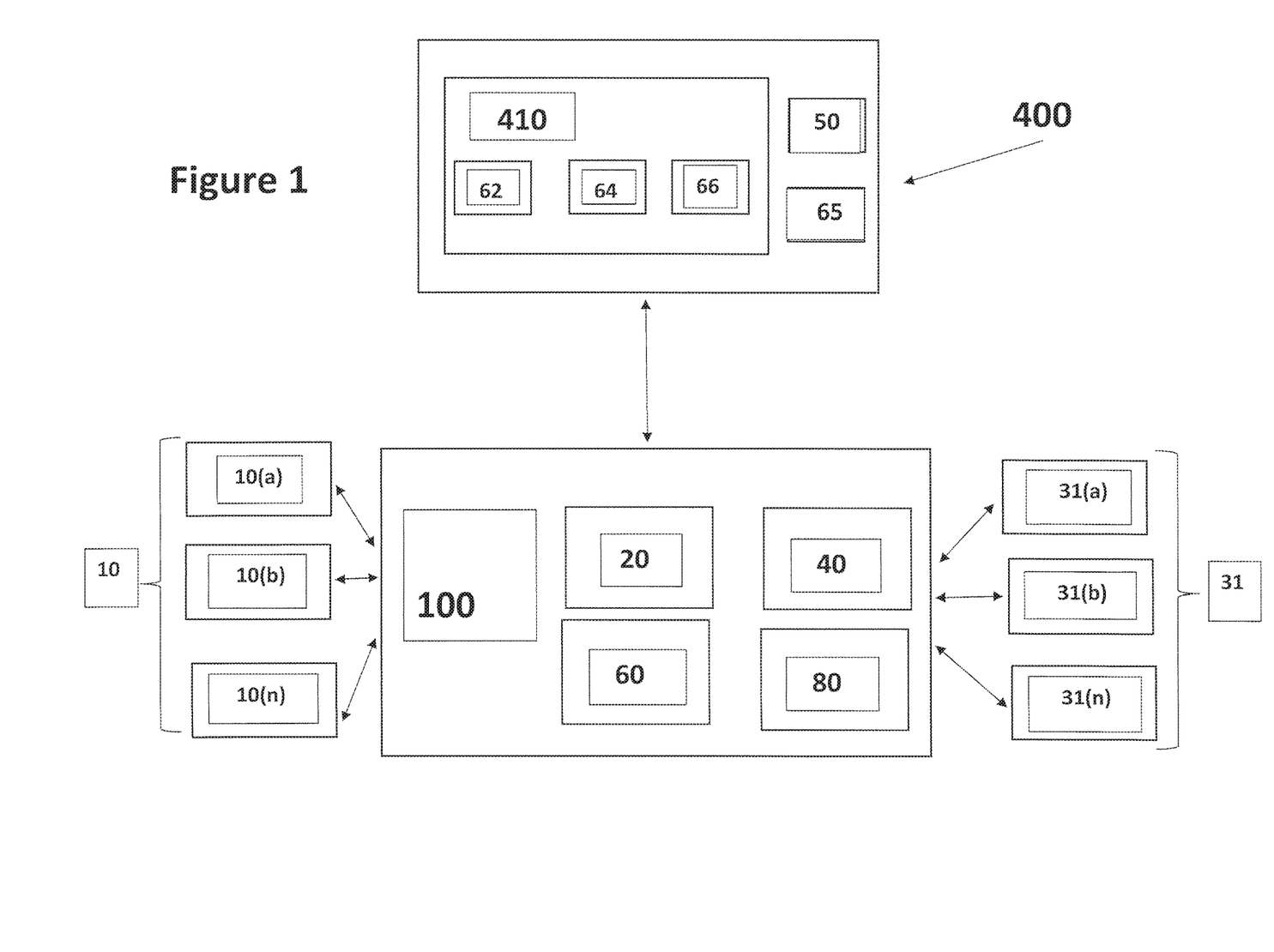
FIG. 1 is an embodiment of the invention.

Referring to FIG. 1, in an embodiment, the information handling and alarm system (100) is comprised of a database (60), a communication system (80), and an alarm system (20). In an embodiment, the information handling and alarm system (100) allows a user or pet owner (10) to provide information related to a pet ("pet information") to at least one third-party (31). In an embodiment, an information handling and alarm system (100) account is associated with a pet owner (10), while a third-party (31) is not required to be associated with an account. The pet information may include where the pet is located (e.g. 262 Maple Street, Anywhere, USA); how to access the pet ((e.g., "a key is under the mat" or "the door entrance code is 123"); medical information for the pet; the pet's preferred food; a task list for the pet; amongst others.

In an embodiment, the communication system (80) comprises a communication bridge (81). The communication bridge (81) allows communication between the information handling system (100) and at least one-third party (31) via email, short message service ("SMS"), multimedia service ("MMS"), voice over internet protocol ("VOIP"), cellular phone, or any combination thereof; or any other form of electronic communication not enumerated herein. In an embodiment, the communication system (80) may also communicate with third-party first responders (31) via the communication bridge (81) or via a third-party application programming interface ("API") or other types of communication software or hardware. For example, the communication system (80) may communicate an emergency to third-party first responders (31) via an ADT® API. In another embodiment, the communication bridge (81) may allow communication between the information handling system (100) and an Internet of Things device. In the description provided herein, the word "communicate" is used to describe any method of communication enumerated above or any combination thereof. The communication system (80) optimizes the highest and best data transmission source to optimize the delivery of pet information between the information handling and alarm system (100), the user, third-party contacts, and emergency responders.

Figure 1A:
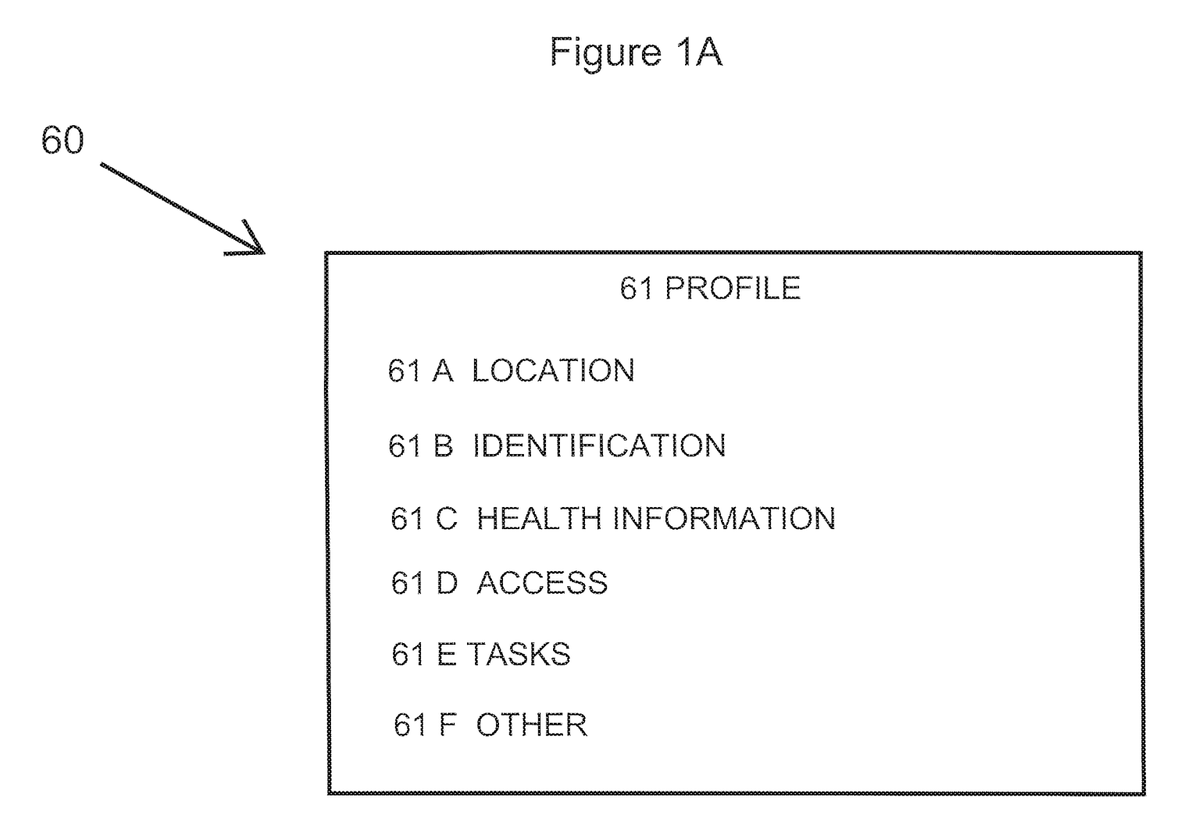
FIG. 1A is an embodiment of the invention.

Referring to FIG. 1 and FIG. 1A, a user or pet owner (10) stores pet information related to at least one pet in the database (60). The information may be a profile (61) and may include location information (61A) (e.g., the address where the pet is located on a certain day), pet identification information (61B) (e.g., what the pet looks like, a photo, etc.), health information (61C) (e.g., veterinarian information, medical history, etc.), how to access the pet (61D)) (e.g. the key is under the mat), list of tasks (61E) (e.g., walk the dog at noon, feed the cat at 6 pm, etc.), or other user-defined information (61F).

In an embodiment, the information handling and alarm system (100) allows a pet owner (10) to identify at least one-third party (31) who may receive communication from the information handling and alarm system (100). The communication system (80) communicates to the third-party (31) a request, on behalf of the pet owner (10), to accept the responsibility of being a pet caretaker (31). The third-party may accept or reject responsibility. The communication system (80) communicates a notification of acceptance or rejection to the pet owner (10). In an embodiment, if the third-party (31) does not respond within a predetermined period, the communication system (80) communicates a rejection notification to the pet owner (10).

Figure 1B:
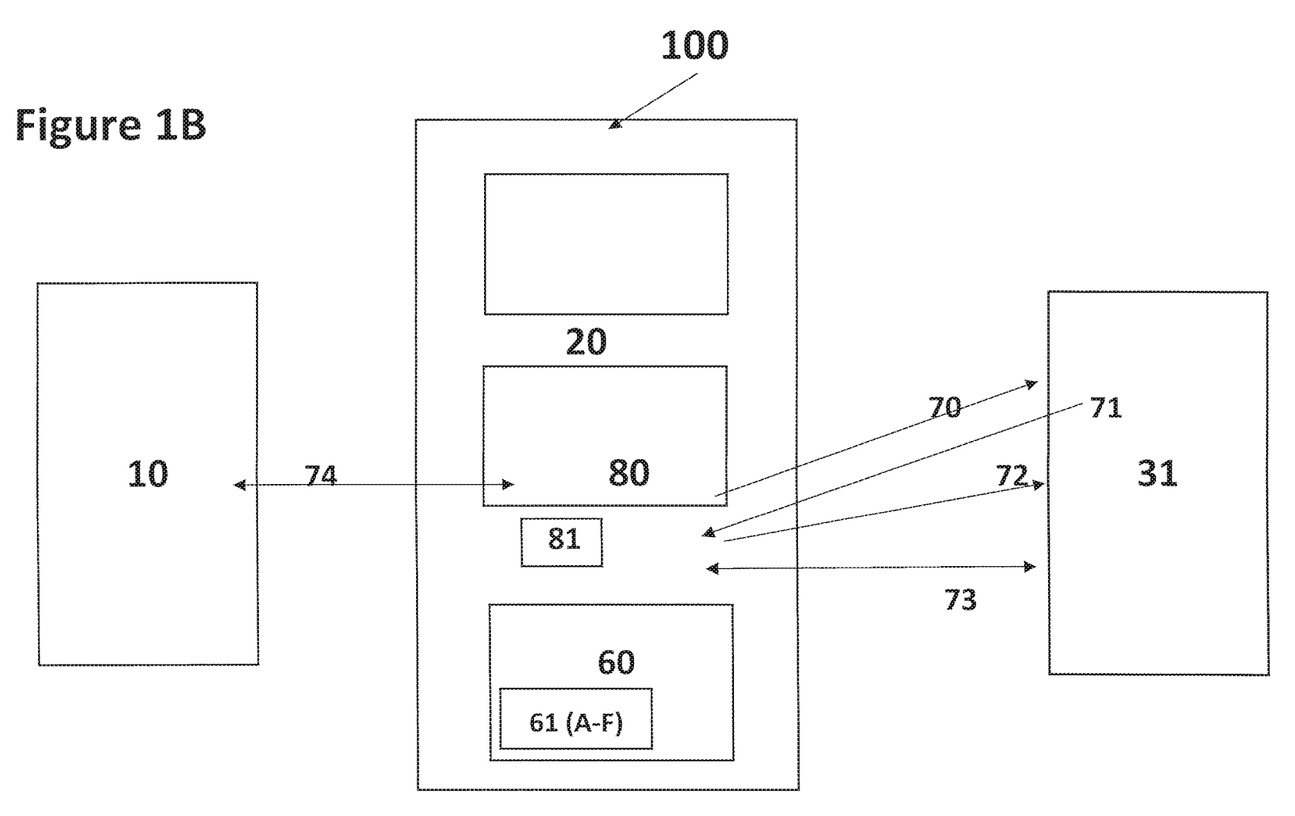
FIG. 1B is an embodiment of the invention.

Referring to FIG. 1B, in an embodiment, the third-party is a pet caretaker (31). Once a pet caretaker (31) accepts responsibility for a pet, the pet owner (10) may assign at least one task (61E), via the communication system (80) to the pet caretaker (31). (70) In an embodiment, the pet caretaker (31) accepts the task (61E). (71) In an embodiment, the pet owner (10) may request the communication system (80) to provide the pet caretaker (31) a reminder of the task (61E). (72) In an embodiment, the pet owner (10) may request the communication system (80) to confirm completion of the assigned task by the pet caretaker (31). (73) In an embodiment, the task (61E) may be a recurring task (61E). In an embodiment, the pet owner (10) may request the communication system (80) to provide the pet caretaker (31) with at least one reminder for each recurring task (61E).

In an exemplary embodiment, the communication bridge (81) sends a SMS to a pet caretaker (31) to accept a task. (70) The SMS may request the pet caretaker to respond with "Y", for example, if he accepts the task. (71) The communication bridge (81) may send an SMS to the pet owner (10) informing the pet owner (10) that the task has been accepted. (74) The communication bridge (81) may provide the pet caretaker (31) with at least a second SMS as a reminder. (72) The communication bridge (81) sends an SMS to the pet caretaker (31) asking for confirmation that the task has been completed. (73) The SMS may request the pet caretaker (31) to respond with a "Y" or "N," for example. For example, the response is communicated to the pet owner (10) by the communication bridge (81) with an SMS. (74)

Figure 4:
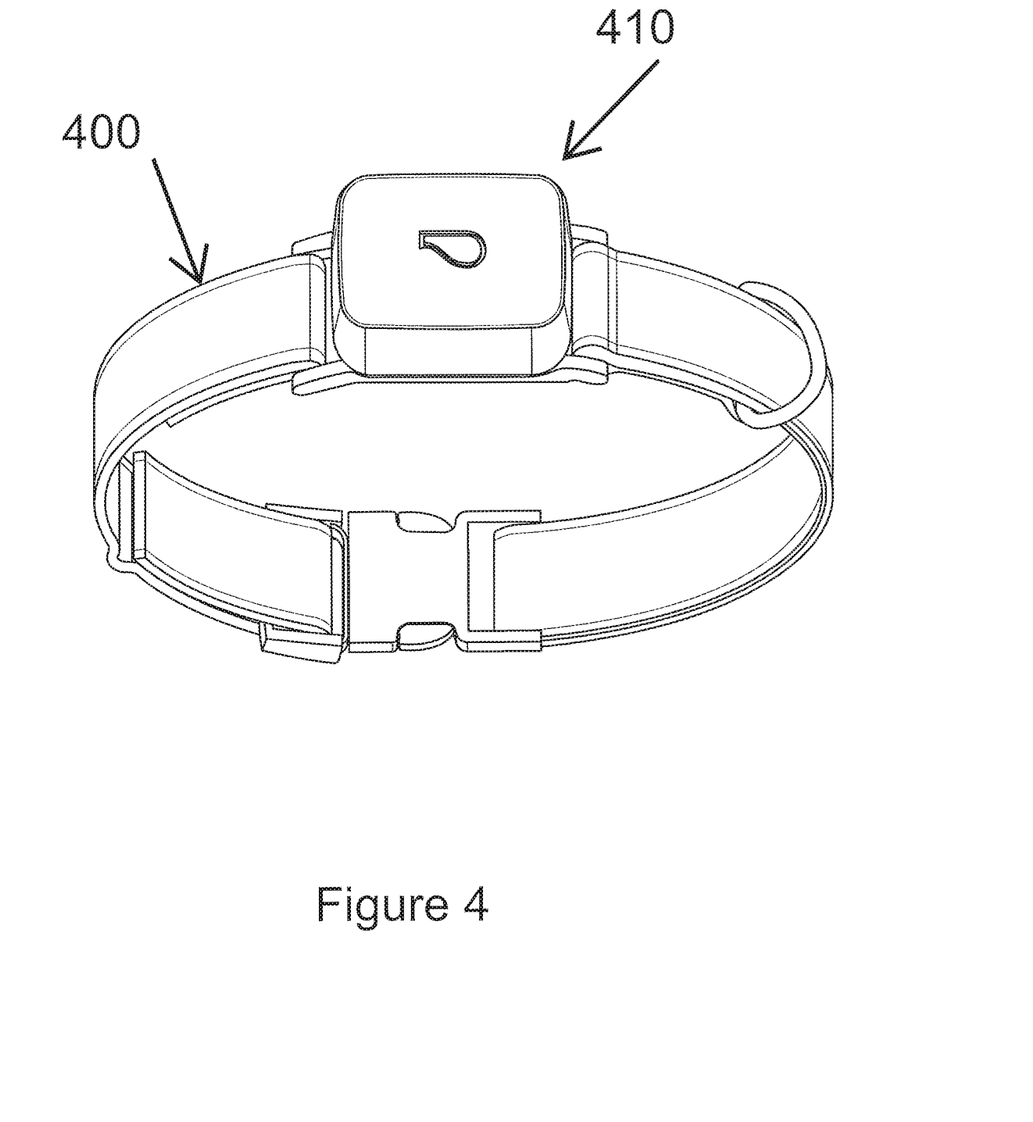
FIG. 4 is an embodiment of the invention.
Figure 5:
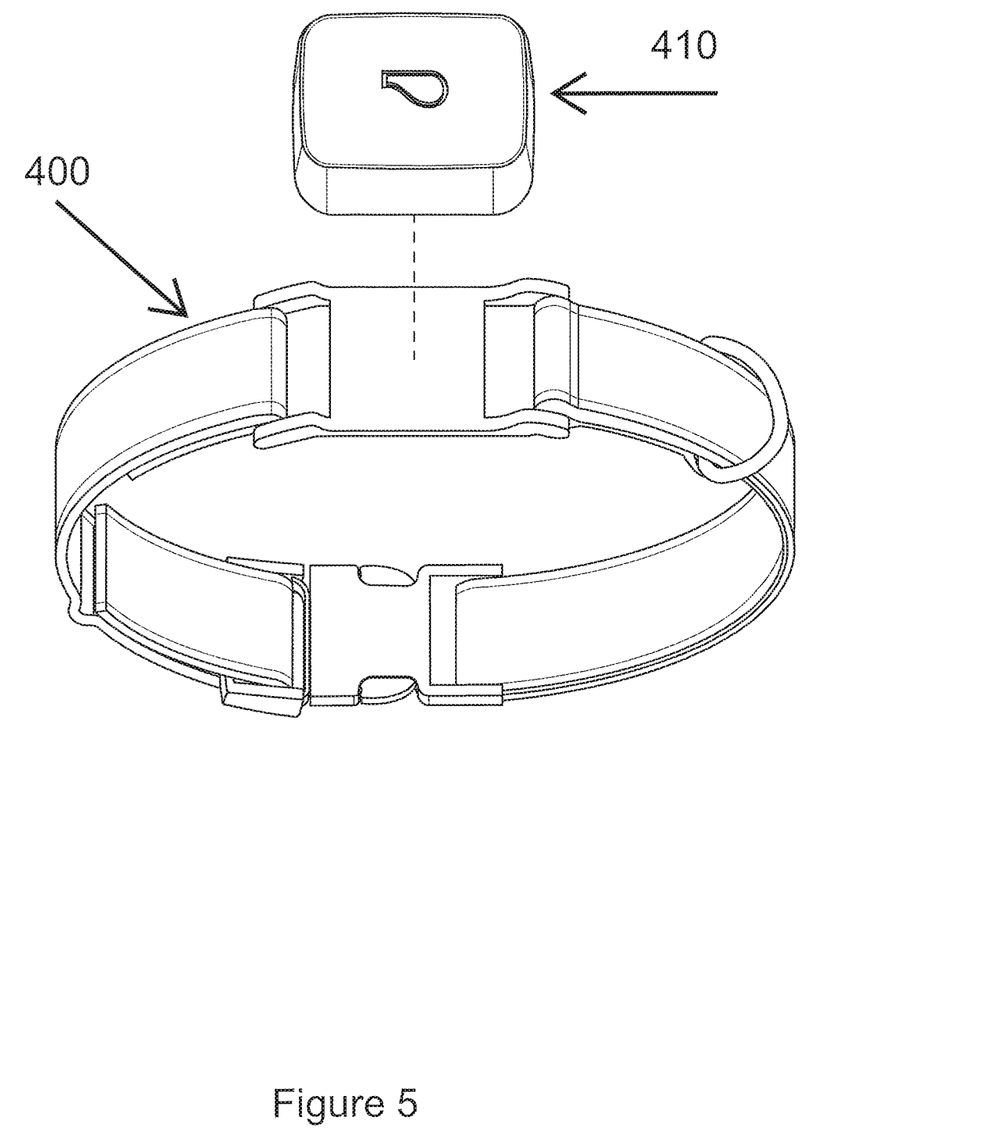
FIG. 5 is an embodiment of the invention.

Referring to FIGS. 1, 4, and 5, in an embodiment, the information handling and alarm system (100) communicates with a collar (400); where the collar (400) is comprised of at least one central processing unit (50) and a tag having a unique identifier (65). In an embodiment, the collar (400) comprises at least one modular, removable attachment (410). In an embodiment, the modular, removable attachment (410) may be a GPS system (64), a RFID system (66), and/or a temperature alarm (62). In a preferred embodiment, the pet collar (400) has an integrated charging system that charges all components (GPS, RFID, and/or temperature alarm). In an embodiment, the collar (400) may have accessories such as an LED light.

The RFID system (66) communicates with the information handling and alarm system (100). One purpose of the RFID system is to quickly locate lost pets by employing all users (10a, 10b . . . 10n) associated with an account on the information handling and alarm system (100).

A user (10) having associated with an account on the information handling and alarm system (100) may deploy the system on a computing device. In an embodiment, the computing device is a cellular phone or mobile pad in an embodiment. The information handling and alarm system (100) will receive an RFID signal when a user is active on the mobile device. In turn, the information handling and alarm system (100) will communicate a pet profile (61) to users (10a, . . . 10n) in the local vicinity, alerting them that a lost pet is nearby, and communicate with the pet owner (10) the location of the lost pet.

In an embodiment, the information handling and alarm system (100) comprises a pet microchip scanner (40). A user may utilize the microchip scanner (40) to obtain a pet profile (61).

In an exemplary embodiment, a pet may become lost. Here, the pet owner (10) may communicate that the pet is lost to the information handling and alarm system (100); the information handling and alarm system (100) alerts the alarm system (20). This alert notifies all user accounts to listen for a particular RFID signal. Once the RFID signal is confirmed at a location, that location is communicated with the pet owner (10). Other nearby users (10a, 10b, . . . 10n) may receive a request to accept responsibility for the lost pet. The nearby user (10a, 10b, . . . 10n) may accept or reject responsibility. Acceptance or rejection is communicated to the pet owner (10). If the user (10a, 10b, . . . 10n) accepts responsibility, he will be provided with the pet profile (61); and the communication system (80) will allow the user (10a, 10b, . . . 10n) and pet owner (10) to communicate. In another exemplary embodiment, when the pet owner (10) communicates a lost pet, a "lost pet" posting will be made on selected social media platforms.

Figure 2:
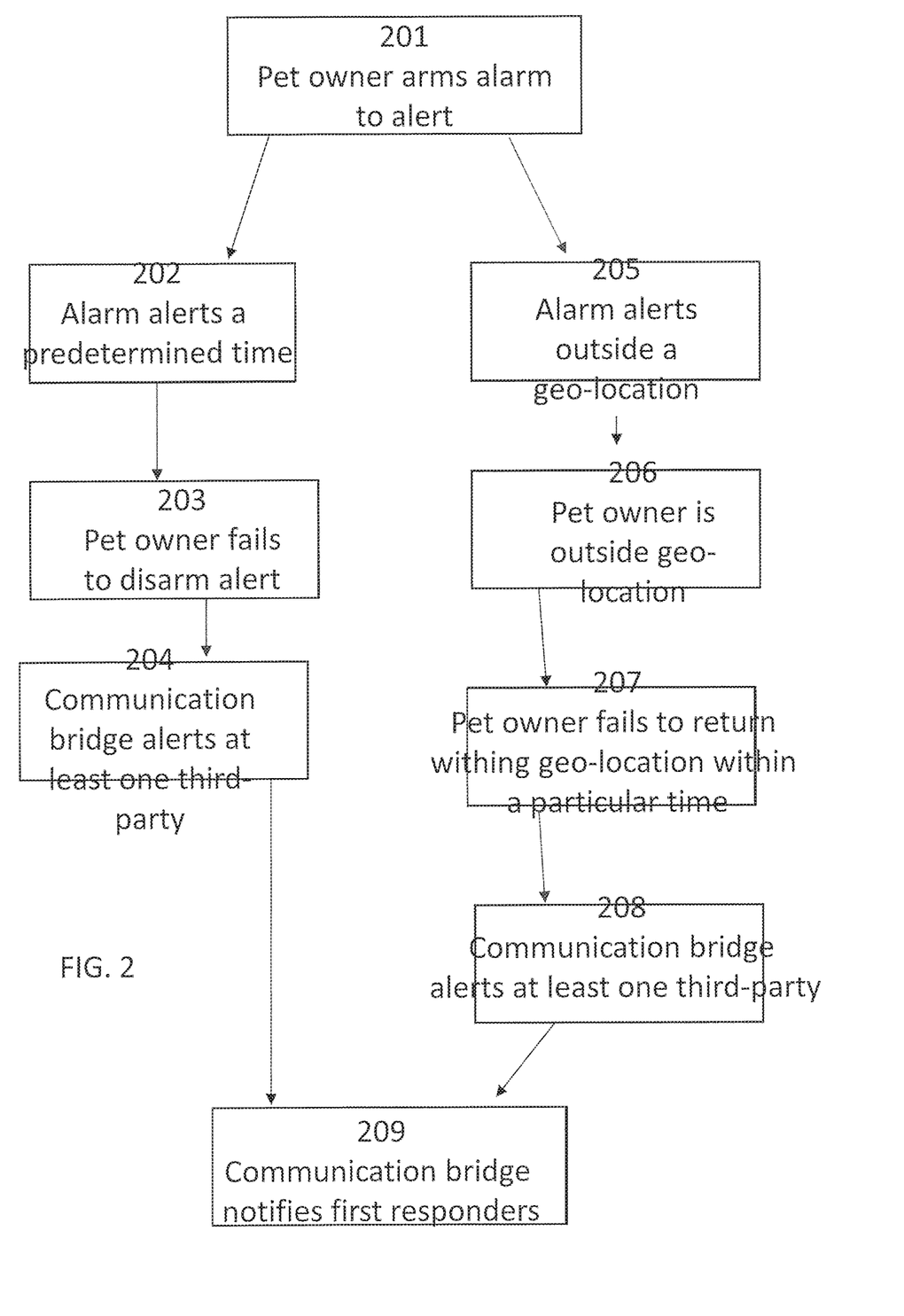
FIG. 2 is a method of the invention.

In an embodiment, referring to FIG. 1 and FIG. 2, in an exemplary method to use the information handling and alarm system (100), a pet owner (10) activates the alarm system (20) to alert at a certain time. (202) If the pet owner (10) does not disarm the alarm system (20) or "check-in" (203), the communication system (80) notifies at least one third-party (31). (204)

In another embodiment, the alarm system (20) is set to alert based on geo-location (205). The GPS system (64) communicates that the pet owner (10) or pet leaves a defined geo-location. (206) In an embodiment, the LED light embedded in the pet collar may start flashing when a pet leaves a defined geo-location.

In a preferred embodiment, the pet owner's (10) mobile phone or tablet, deploying the information handling and alarm system (100), and having a GPS system communicates that the user (10) is leaving defined geo-location to the information handling and alarm system (100). If the pet owner (10) does not return within to a defined geo-location—within the defined time (207), the communication system (80) communicates this information with at least one third-party (31). (208) In an embodiment, the third party (31) is a first responder or security service. (209)

Referring to FIG. 1, and FIG. 1A, in one embodiment, the information handling and alarm system (100) allows a pet owner (10) to identify a plurality of third parties (31) as potential pet caretakers (31a, 31b, . . . 31n). The communication bridge (81) will communicate a request to each of the plurality of third parties (31), on behalf of the pet owner (10), requesting each to accept the responsibility of being a pet caretaker (31a, 31b, . . . 31n). The communication system (80) communicates a notification of acceptance or rejection to the pet owner (10) for each of the plurality of pet caretakers (31a, 31b, . . . 31n). The communication bridge (81) will communicate a request to take care of pet(s) with the first pet caretaker (31a). If the first pet caretaker (31a) communicates that he or she is unable to take care of the pet, then the communication bridge (81) will communicate with a second pet caretaker (31b) to take care of the pet. In an embodiment, the communication bridge (81) may cycle through each set of pet caretakers (31a, 31b, . . . 31n) until one pet caretaker (31) accepts responsibility for the pet. In an embodiment, if the first pet caretaker (31a) is unable to complete an assigned task (61E), the communication bridge (81) may cycle through each set of pet caretakers (31a, 31b, . . . 31n) until one pet caretaker (31) accepts the task (61E).

In an embodiment, when the pet caretaker (31) accepts responsibility for the pet, the information handling and alarm system (100) allows the pet caretaker (31) to access information in the database (60).

In an embodiment, a third-party or pet rescuer (31) may input the unique identifier (65) into the information handling and alarm system (100) to receive information on how to contact the pet owner (10). In one embodiment, the communication system (80) notifies the pet owner (10) that his or her pet has been found. In one embodiment, the communication system (80) creates a communication bridge (81) between the pet owner (10) and the pet rescuer (31).

In one embodiment, if the pet owner (10) does not respond to the notification from the information handling and alarm system (100), the communication bridge (81) will communicate with each pet caretaker (31a, 31b, . . . 31n) that the pet has been found until one pet caretaker responds to the pet rescuer (31). In an embodiment, once a pet caretaker (31) has accepted responsibility for the pet, the pet owner (10) and each pet caretaker (31a, 31b, . . . 31n) is notified.

In one embodiment, when the local environmental temperature of a pet gets too high or low the temperature alarm (62) is activated and the communication system (80) alerts the pet owner (10); a request to acknowledge the alert is communicated with the pet owner (10). If the pet owner (10) does not acknowledge the alert, the communication bridge (81) cycles through each pet caretaker (31a, 31b, . . . 31n) until one acknowledges the alert and accepts responsibility for the pet. If there is no acknowledgement from the pet owner (10) or pet caretaker (31a, 31b, . . . 31n), the communication bridge (80) communicates with third-party first responders (31).

Figure 3:
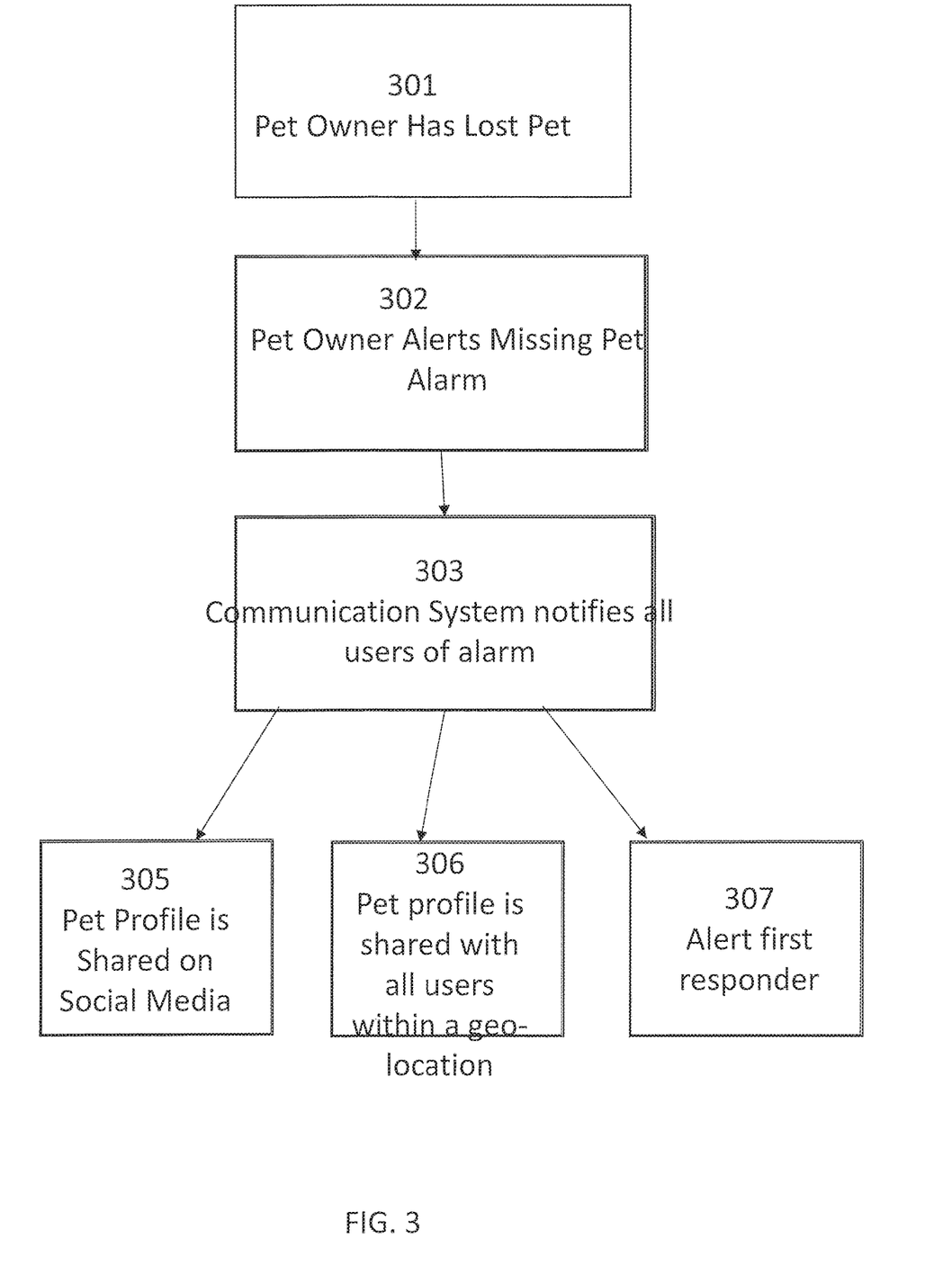
FIG. 3 is a method of the invention.

Referring to FIG. 1, FIG. 1A and FIG. 3, in an embodiment, if the pet owner (10) realizes that his or her pet is missing (301), the pet owner (10) may alert the alarm system (20). of a lost pet (302). In an embodiment, once the alarm system (20) is activated, the communication system (80) notifies all users (10a, 10b, . . . 10n) that the pet is missing. (303) In an embodiment, the communication system (80) alerts and provides a profile (61) to all users (10a, 10b, . . . 10n) within a certain geo-location. (306) In an embodiment, the communication system (80) alerts third-party first responders (31). (307) In an embodiment, the communication system (80) shares a profile to social media. (305) The methods and systems described herein may be deployed in part or in whole through a machine that executes computer software, program codes, and/or instructions on a processor. The present invention may be implemented as a method on a machine, as a system or apparatus as of or in relation to the machine, or as a computer program product embodied in computer readable medium executing on one or more of the machines. The processor may be part of a servicer, client, network infrastructure, mobile computing platform, stationary computing platform, or other computing platforms. A processor may be any kind of computational or processing device capable of executing program instructions, codes, binary instructions, and the like. The processor may be or includes a single processor, digital processor, embedded processor, microprocessor, or any variant such as a co-processor (math co-processor, graphic co-processor, communication co-processor and the like) and may directly or indirectly facilitate execution of multiple program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have been assigned priorities associated with them; the processor may execute these threads based on priority or any other order based on instructions provided in the program code. The processor may include memory that stores methods, codes, instructions, and programs as described herein and elsewhere. The processor may access a storage medium associated with the processor to storing methods, programs, codes, program instructions or other types of instruction capable of being executed by the computing process device may include but may not be limited to one or more of CD-ROM, DVD, memory, hard disk, flash drive, RAM, ROM, cache, and the like.

A processor may include one or more cores that may enhance speed and performance of a multiprocessor. In embodiments, the processor may be a dual core processor, quad core processor, or other chip level multiprocessor and the like that combine two or more independent cores (called a die).

The methods and systems described herein may be deployed in part or in whole through a machine that executes computer software on a server, client, firewall, gateway, hub, router, or other such computer or networking hardware. The software program may be associated with a server that may include a file server, print server, domain server, internet server, intranet server, and another variant such as secondary server, host server, distributed server, and the like. The server may include one or more of memories, processors, computer communication devices, and interfaces capable of accessing other client servers, clients, machines, and devices through wired or wireless medium, and the like. The methods, programs or codes described herewith and elsewhere may be executed by the server. In addition, other devices required for execution of methods as described in this application as part of an infrastructure associated with the server.

The server may provide an interface to other devices including, without limitation, clients, other servers, printers, database servers, print servers, file servers, communication servers, distributed servers, and the like. Additionally, this coupling and connection may facilitate remote execution of program across the network. The networking of some or all these devices may facilitate parallel processing of a program or method at one or more locations without deviating from the scope of the invention. In addition, any of the devices attached to the server through an interface may include at least one storage medium capable of storing methods, programs, code and/or instructions to be executed on different devices. In this implementation, the remote repository may act as a storage medium for program code, instructions, and programs.

The software program may be associated with a client that may include a file client, print client, domain client, internet client, and other variants such as secondary clients, host clients, distributed clients, and the like. The client may include one or more memories, processors, computer readable media, storage media, ports (physical and virtual). Communication devices, and interfaces capable of accessing other clients, servers, machines, and devices, and interfaces capable of accessing other clients, servers, machines, and devices, through a wired or wireless medium, and the like. The methods, programs or codes as described herein and elsewhere may be executed by the client. In addition, other devices required for execution of the methods as described herein this application may be considered as a part of the infrastructure associated with the client.

The client may provide an interface to other devices including without limitation, servers, other clients, printers, data-based servers, file servers, communications servers, distributed servers, and the like. Additionally, coupling and/or connection may facilitate remote execution of a program across the network. The networking of some or all the devices may facilitate parallel processing of a program or method at one or more locations without deviating from the scope of this invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The method and systems described herein may be deployed in part or in whole through network infrastructures. The network infrastructure may include elements such as computing devices, servers, routers, hubs, firewalls, clients, personal computers, communication devices, routing devices, and other active and passive devices, modules and/or components known in the art. The computing and or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be GSM, GPRS, #G 4G, EVDO, mesh, or other network types.

The methods, programs, codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as a flash memory, buffer, RAM, ROM, and one or more computing devices. The computing devices associated with mobile devices maybe enabled to execute program codes, methods, and instructions stored thereon. Alternatively, the mobile device maybe configured to execute instructions in collaboration with other devices. The mobile devices may communicate on a peer-to-peer network. The program code maybe stored on the storage medium associated with the server and executed by a computing device embedded within the server. The base station may include a computing device and a storage medium. The storage device may store program code and instructions executed by computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage such as optical discs, forms of magnetic storage, like hard disks, tapes, drums, cards, and other types; processor registers, cache memory, volatile memory, non-volatile memory, optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, network attached storage, file addressable, content addressable, network, barcodes, magnetic ink, and the like.

The methods and systems described herein may transform physical and/or intangible items from one state to another. The methods and systems described herein may also transform data representing physical and/or intangible items from one state to another.

The elements described and depicted herein, including flow charts and block diagrams throughout the figures, imply logical boundaries between the elements. However, according to software or hardware engineering practices, the depicted elements and functions thereof may be implemented on machines through computer executable media having a processor capable of executing program instructions, as standalone software modules, or as modules that employ external routines, codes, services, and so forth, or any combination of these, and all such implementations maybe within the scope of the present disclosures. Examples of such machines may include, but may not be limited to, personal digital assistants, laptops, personal computers, mobile phones, other handheld computing devices, medical equipment, wired or wireless communication devices, transducers, chips, calculators, sat-ellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps hereof, may be realized in hardware, software or any combination of hardware and software suitable for an application. The hardware may include a general-purpose computer and/or dedicated computing device or specific computing device or aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as JAVA, C, an object oriented programming language such as C++, or any other high level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in several ways, or all the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim as our invention:

1. An information handling and alarm system deployed on a computing device comprising at least one database, a communication system, and an alarming system whereby:
   a. a user having a user account on the information handling and alarm system provides to the database information related to at least one pet; whereby the information includes at least: location information of the pet, identification information for the pet, health information for the pet, how to access the pet, list of tasks for the pet;
   b. the user provides at least one third-party to the information handling and alarm system;
   c. where the third-party does not have a user account;
   c. whereby the communication system allows communication between the user and the third-party;
   d. whereby, when the third-party accepts future communications, the user may assign the third-party at least one task.

2. The information handling and alarm system of claim 1 communicates with at least one collar comprising a temperature sensor, GPS system, RFID, Bluetooth, and/or IoT technologies.

3. The information handling and alarm system of claim 2, where the collar communicates to the alarming system that the pet needs care.

4. The information handling and alarm system of claim 3, where the communication system communicates to each third-party instructions to care for the pet and the last known location of the user and pet.

5. The information handling and alarm system of claim 3 triggers amber alerts and/or posts of a lost pet to at least one social media site when a geofence is breached.

6. The information handling and alarm system of claim 3, where the communication system communicates to first responders and/or provides a security provider instruction to rescue and/or care for the pet, and the last known location of the user and pet.

7. The information handling and alarm system of claim 3, where the communication system communicates to known and unknown third-parties that a lost pet is in the vicinity.

8. The information handling and alarm system of claim 6, where the communication system communicates to unknown and known third-parties instructions to care for the pet and the last known location of the user and pet.

9. The information handling and alarm system of claim 2, where the communication system communicates to each third-party instructions to care for the pet and the last known location of the user and pet.

10. The information handling and alarm system of claim 1, where the user sets a check-in alert; when the user fails to respond to the check-in alert, the communication system communicates to each third-party and/or first-responders or other security system instructions to care for the pet and the last known location of the user and pet.

11. The information handling and alarm system of claim 1, where the communication system optimizes the best transmission source to optimize the delivery of pet information between each third-party, first responder, and/or other security systems.

12. The information handling and alarm system of claim 1, where the information handling systems connect to at least one Internet of Things device.

* * * * *